United States Patent [19]

Grace et al.

[11] Patent Number: 5,538,841
[45] Date of Patent: Jul. 23, 1996

[54] USE OF GLOW DISCHARGE TREATMENT TO PROMOTE ADHESION OF AQUEOUS COATINGS TO SUBSTRATE

[75] Inventors: Jeremy M. Grace; Janglin Chen, both of Rochester; Louis J. Gerenser, Webster; David A. Glocker, West Henrietta, all of N.Y.

[73] Assignee: Eastman Kodak Company, Rochester, N.Y.

[21] Appl. No.: 396,838

[22] Filed: Mar. 1, 1995

Related U.S. Application Data

[62] Division of Ser. No. 199,416, Feb. 22, 1994, Pat. No. 5,425,980.

[51] Int. Cl.[6] .................................................. G03C 1/795
[52] U.S. Cl. ........................... 430/533; 430/531; 430/532
[58] Field of Search .................................. 430/532, 533, 430/535; 427/535, 536; 438/482; 204/164, 165

[56] References Cited

U.S. PATENT DOCUMENTS

| | | | |
|---|---|---|---|
| 3,288,638 | 11/1966 | Paassen et al. | 117/213 |
| 3,411,908 | 11/1968 | Crawford et al. | 430/503 |
| 3,531,314 | 9/1970 | Kerr et al. | 117/34 |
| 3,607,345 | 9/1971 | Thomas et al. | 117/34 |
| 3,630,742 | 12/1971 | Crawford et al. | 430/529 |
| 3,661,735 | 5/1972 | Drelich | 204/165 |
| 3,833,403 | 9/1974 | Kogure et al. | 117/47 A |
| 3,837,886 | 9/1974 | Tatsuta et al. | 117/34 |
| 3,860,427 | 1/1975 | Matsuo et al. | 430/532 |
| 3,874,877 | 4/1975 | Omichi et al. | 430/532 |
| 3,888,753 | 6/1975 | Klikka et al. | 204/168 |
| 4,009,037 | 2/1977 | Mann et al. | 430/532 |
| 4,055,685 | 10/1977 | Bayer et al. | 430/532 |
| 4,087,574 | 5/1978 | Jamaguchi et al. | 427/474 |
| 4,229,523 | 10/1980 | Ohta et al. | 430/532 |
| 4,267,202 | 5/1981 | Nakayama et al. | 427/40 |
| 4,292,032 | 9/1981 | Luke | 493/43 |
| 4,363,872 | 12/1982 | Ealding et al. | 430/532 |
| 4,394,442 | 7/1983 | Miller | 430/532 |
| 4,451,497 | 5/1984 | Dolezalek et al. | 427/535 |
| 4,645,602 | 2/1987 | Asakura et al. | 428/141 |
| 4,663,236 | 5/1987 | Lanthonsen et al. | 428/482 |
| 4,689,359 | 8/1987 | Ponticello et al. | 524/23 |
| 4,695,532 | 9/1987 | Ponticello et al. | 430/533 |
| 4,933,267 | 6/1990 | Ishigski et al. | 430/501 |
| 4,954,430 | 9/1990 | Ishigski et al. | 430/534 |
| 5,004,669 | 4/1991 | Yamada et al. | 430/264 |
| 5,073,455 | 12/1991 | Nose et al. | 428/411.1 |
| 5,244,780 | 9/1993 | Strobel et al. | 430/535 |
| 5,326,689 | 7/1994 | Murayama | 430/530 |

FOREIGN PATENT DOCUMENTS

WO86/02766  5/1986  WIPO.

*Primary Examiner*—Hoa Van Le
*Attorney, Agent, or Firm*—Arthur H. Rosenstein

[57] ABSTRACT

The present invention is a polyester film base which has a surface approximately 5 nm thick. The surface of the film base has been altered to include about 6 to 15 atomic percent nitrogen in the form of imines, secondary amines and primary amines in the ratio of about 1:1:2. The invention also includes a film base whose surface includes oxygen in the form of hydroxyl, ether, epoxy, carbonyl or carboxyl groups wherein the oxygen is about 4 to 10 atomic percent above the original surface content of the base. The polyester film base can be either polyethylene terephthalate or polyethylene naphthalate.

4 Claims, No Drawings

USE OF GLOW DISCHARGE TREATMENT TO PROMOTE ADHESION OF AQUEOUS COATINGS TO SUBSTRATE

This is a divisional of application Ser. No. U.S. 199,416, filed Feb. 22, 1994, U.S. Pat. No. 5,425,980.

FIELD OF THE INVENTION

The present invention relates to the manufacture of photosensitive materials. More specifically, the present invention is a polyester material having the proper surface characteristics to promote adhesion of photosensitive coating materials.

BACKGROUND OF THE INVENTION

Corona discharge treatment (CDT), which produces a gaseous discharge at atmospheric pressure, is widely used to promote the adhesion of photographic layers to the supporting base material or to one another. Examples of the use of corona discharge treatment are found in U.S. Pat. Nos. 4,394,442; 4,229,523; 4,363,872; 4,292,032; 4,663,263; 4,009,037; 4,087,574; 4,055,685; 5,004,669; 3,874,877; 3,860,427; 3,630,742; 3,607,345; 3,531,314 and 3,411,908. Corona discharges, however, are relatively uncontrolled. Most often, they take place in an ambient environment, so that differences in relative humidity and temperature can lead to non-reproducible results. Another characteristic of corona discharge treatments at atmospheric pressure is the presence of streamers, or intense localized discharges. We have found, by using x-ray photoelectron spectroscopy (XPS), that surfaces of CDT treated polymers have large spatial variations in the degree of treatment. It is theorized that the variability of the surfaces is due to the presence of streamers.

To avoid these problems, the use of glow discharge treatments (GDT), which take place at reduced pressures, has been suggested. A GDT discharge is much more diffuse than a CDT discharge and the treatment is uniform and reproducible. This makes it a better process than CDT for many applications. Glow discharges are a well-known method of promoting adhesion in a wide variety of systems. For example, U.S. Pat. No. 3,288,638 describes the GDT treatment of polymers in an inert gas environment to promote adhesion of metals. The desirable results of adhesion are attributed to the bombardment of the surfaces by inert gas ions and electrons.

U.S. Pat. No. 3,837,886 describes the use of GDT to promote the adhesion of a gelatine containing binder to biaxially drawn, surface roughened polystyrene. Tatsuta and Ueno, the inventors of U.S. Pat. No. 3,837,886, find that GDT is ineffective without first roughening the polystyrene surface. They also report that the choice of treatment gas is unimportant.

Dolezalek, et al (U.S. Pat. No. 4,451,497), discuss the treatment of various polyester supports to promote the adhesion of photographic emulsions directly onto the support. They attribute the beneficial effects to a reduction in surface charge and report no particular dependence on the gas used in the treatment.

Ishigaki and Naoi (U.S. Pat. No. 4,933,267) report using GDT in connection with improving the dimensional stability of photographic systems, but mention no reason to choose a particular treatment gas. The implication is that the treatment is done in residual air. In a subsequent patent (U.S. Pat. No. 4,954,430), they describe the use of GDT prior to coating with a copolymer containing vinylidine chloride and again fail to mention any advantage to the use of a particular treatment gas.

Stroebel (European Application 92303556.2) teaches that nitrogen CDT can be effective, carried out at atmospheric pressure, if the temperature of the support is elevated during treatment. There is no evidence that GDT in nitrogen at ambient temperatures would be effective. Thus, the prior art does not teach what surface conditions are required on a polyester substrate for promoting adhesion of photosensitive coating compositions.

Finally, in U.S. Ser. No. 07/889,827 filed on Jun. 1, 1992 an Ion Selective Electrode and Method of Manufacture is described. The method uses glow discharge to deposit metallic silver on a polymeric surface. This application also does not teach what surface conditions are required for promoting adhesion of photosensitive coatings to polyester substrates.

The present invention characterizes the surface chemistry of the support that is beneficial for adhesion of the photographic layers. The treatment conditions for obtaining a proper support using GDT, are optimized. The optimization includes the type of gas in which the treatment takes place, the pressure and the energy density.

SUMMARY OF THE INVENTION

The present invention is a film base which includes a polyester substrate having a surface approximately 5 nm thick. The surface includes nitrogen from about 7 atomic percent to about 15 atomic percent wherein the nitrogen is in the form of imines, secondary amines and primary amines in the ratio of about 1:1:2. The film base of the present invention can be either polyethylene naphthalate or polyethylene terephthalate.

The present invention also includes a film base which is made from a polyester substrate having a surface approximately 5 nm thick, the surface including oxygen in the form of hydroxyl, ether, epoxy, carbonyl or carboxyl groups wherein the oxygen is from about 4 atomic percent to about 10 atomic percent above the original oxygen content (22% for PEN and 28.6% for PET). The polyester can be either polyethylene naphthalate or polyethylene terephthalate.

The present invention also includes the film base described above produced by a glow discharge treatment process.

DETAILED DESCRIPTION OF THE INVENTION

A series of statistically designed experiments was performed on two film bases, polyethylene naphthalate (PEN) and polyethylene terephthalate (PET). In these experiments, the various factors associated with glow discharge treatment were varied in a controlled way, and the resultant adhesion of emulsions or emulsions and subbing layers to the treated material was assessed. The adhesion measurements were performed dry, using adhesive tape, and wet, using a photographic processing solution and a rubber-padded abrader.

A typical experimental design is shown in Table A. In this experiment the partial pressures of argon, oxygen and nitrogen were controlled, along with web speed and power of the discharge. Gas partial pressures ranged from 0 to 50 mTorr, web speeds were varied from 5 to 10 fpm and cathode power was varied from 15 to 180W. The glow-discharge cathode was powered by a 60 Hz, full-wave rectified high-voltage supply. The web material was 5 inches wide and was coated with either a photographic emulsion or a subbing layer subsequent to the GDT process.

TABLE A

GDT Process Conditions

| Run # | Ar (mTorr) | Oxygen (mTorr) | Nitrogen (mTorr) | Web Spd. fpm | Power Watts |
|---|---|---|---|---|---|
| 1 | 25 | 25 | 25 | 7.5 | 97.5 |
| 2 | 50 | 0 | 50 | 10 | 15 |
| 3 | 50 | 0 | 0 | 10 | 180 |
| 4 | 0 | 0 | 50 | 10 | 180 |
| 5 | 50 | 50 | 50 | 5 | 15 |
| 6 | 0 | 50 | 50 | 5 | 180 |
| 7 | 0 | 0 | 50 | 5 | 15 |
| 8 | 0 | 50 | 0 | 10 | 180 |
| 9 | 50 | 50 | 0 | 10 | 15 |
| 10 | 25 | 25 | 25 | 7.5 | 97.5 |
| 11 | 50 | 50 | 0 | 5 | 180 |
| 12 | 50 | 0 | 0 | 5 | 15 |
| 13 | 50 | 50 | 50 | 10 | 180 |
| 14 | 8 | 8 | 8 | 5 | 180 |
| 15 | 0 | 50 | 0 | 5 | 15 |
| 16 | 50 | 0 | 50 | 5 | 180 |
| 17 | 8 | 8 | 8 | 10 | 15 |
| 18 | 0 | 50 | 50 | 10 | 15 |
| 19 | 25 | 25 | 25 | 7.5 | 97.5 |

Before conducting a wet or dry adhesion test, the samples were conditioned at 90° F., 50% relative humidity for 24 hours. The dry adhesion tape test included a piece of 7.5 cm long, 2.5 cm wide Scotch™ #610 Transparent Tape tightly pressed onto and across a section of the emulsion which measured approximately 6.3 cm². The emulsion had been lightly scribed with a razor blade in a cross-hatch pattern approximately every 2 mm. The tape was then quickly pulled off, and the area of the coating removed was recorded and assigned a degree of failure. The criteria used in this experiment for designating the degree of failure are as follows:

0 degree—no coating removed 1 degree—slight, about 0.1 cm² of coating removed 3 degree—moderate, about 1 cm² of coating removed 3–6 degree—poor, between 1 and 4 cm² of coating removed 7 degree—severe, between 4 and 6 cm² of coating removed 7+degree—catastrophic failure, entire taped area striped The wet adhesion test included the following steps. The emulsion coated samples were cut to 35 mm by 12.7 cm strips and soaked in the appropriate developer solution for 3 minutes and 15 seconds at 100° F. After soaking in the developer, the sample was scribed in the width direction and placed in the apparatus, with developer solution covering the sample. The apparatus includes an arm with a rubber pad approximately 3.5 cm in diameter attached to the end. The 900 gram weight is applied and the pad is mechanically rubbed perpendicular to the scribed line for 100 cycles at a speed of 60 cycles per minute. Three replicate samples were run for each test. The amount of emulsion removed, if any, was measured using a grid to determine the percent removed.

The following codes for degree of failure are:

0—no coating removed, excellent wet adhesion

1–5—minimal coating removed, very good wet adhesion

5–25—fair wet adhesion

26–75—poor wet adhesion

76–100—catastrophic failure

The results of the adhesion tests are shown in Table B.

TABLE B

| Run # | (Dry Adhesion) Tape | (Wet Adhesion) |
|---|---|---|
| 1 | 0 | 0 |
| 2 | 0 | 0 |
| 3 | 0 | 100 |
| 4 | 0 | 0 |
| 5 | 3-6 | 100 |
| 6 | 0 | 100 |
| 7 | 0 | 0 |
| 8 | 0 | 0 |
| 9 | 0 | 0 |
| 10 | 0 | 0 |
| 11 | 0 | 100 |
| 12 | 7+ | 100 |
| 13 | 0 | 0 |
| 14 | 0 | 0 |
| 15 | 0 | 10 |
| 16 | 0 | 0 |
| 17 | 0 | 60 |
| 18 | 0 | 0 |
| 19 | 0 | 0 |

Statistical analysis was performed on the data shown in Table A and Table B. The most significant factors for the treatment of PEN or PET are discussed below. The analysis revealed that the treatments in nominally pure nitrogen, oxygen and argon do not give similar results. In particular, the best operating conditions in nitrogen for PEN are at low powers and high web speeds. In contrast, the best operating conditions in oxygen for PEN are at high powers and low web speeds. In addition, argon treatments have a much smaller beneficial effect on wet adhesion. The choice of discharge gas, discharge power and web speed all have an effect on the adhesion test results. In order to examine these adhesion test results, x-ray photoelectron spectroscopy (XPS), high resolution electron energy loss spectroscopy (HREELS) and static secondary ion mass spectroscopy (SSIMS) were all used to characterize the surface of the treated PEN or PET. In addition, contact angle measurements were made with aqueous solutions buffered to an acidic (pH 2.5–3.5) or basic pH (pH 11–12) level. Static wetting angle measurements of these solutions on the treated substrates were made with conventional optical methods.

PEN AS SUBSTRATE

EXAMPLE 1

In order to illustrate the nature of the invention, samples were made and compared under four treatment conditions. GDT A was a nitrogen treatment done using a 40 kHz power supply at an energy of 4.5 J/cm² and a pressure of 70 mTorr. GDT B was an oxygen treatment done using a dc power (full wave rectified AC) supply at an energy of 0.3 J/cm² and a pressure of 50 mTorr. GDT C was a nitrogen treatment done using a 40 kHz power supply at an energy of 0.9 J/cm² and a pressure of 70 mTorr. GDT D was an oxygen treatment done using a dc power supply at an energy of 1.7 J/cm² and a pressure of 50 mTorr. In these examples the energy per unit area is defined as the output of the power supply in watts per cm of web width divided by the web speed in cm/sec.

Table 1 shows the results of both wet and dry adhesion tests on various coatings applied to these treatments, and compares these results to the cases of no treatment and conventional atmospheric CDT treatment. The coatings were either a color photographic emulsion coated directly onto the support, a conventional gel subbing layer coated prior to the emulsion or a combination of latex and gelatin (single sub) described in U.S. Pat. Nos. 4,695,532 and 4,689,359 coated prior to the emulsion.

Color negative or black and white emulsions were coated, chill set and dried in conventional processes. Gel sub coatings were coated and dried at coverages of approximately 100mg/m$^2$. Latex/gelatin sub coatings as described in U.S. Pat. Nos. 4,695,532 and 4,689,359 were coated to coverages of approximately 350 mg/m$^2$. In the latter cases, color negative and black and white silver halide emulsions were coated over the subbing layers, chill set and dried in conventional processes.

TABLE 1

| Treatment Condition | Subbing | Dry Adhesion (0: no removal, 7: complete removal) | Wet Adhesion (% removed) |
|---|---|---|---|
| No treatment | gel sub | 7+ | 100 |
| No treatment | single sub | 7+ | 100 |
| CDT | gel sub | 7 | 100 |
| CDT | single sub | 0–1 | 5–20 |
| GDT A | no sub | 0 | 85 |
| GDT A | gel sub | 0 | 93 |
| GDT A | single sub | 0 | 0 |
| GDT B | no sub | 0 | 10 |
| GDT B | single sub | 0 | 0 |
| GDT C | no sub | 0 | <1 |
| GDT C | gel sub | 0 | 2.8 |
| GDT C | single sub | 0 | 0 |
| GDT D | no sub | 0 | 0 |
| GDT D | gel sub | 0 | 0 |
| GDT D | single sub | 0 | 0 |

We see that for the case of no treatment, there is catastrophic failure whether the support is coated with a gel sub or single sub formulation. We see that CDT treatment is still ineffective at promoting the adhesion of gel sub to the support, but significantly improves the adhesion of the single sub. Nevertheless, because of the inconsistent nature of CDT mentioned previously, there are occasions when there is up to 20% removal in the wet adhesion test of the single sub on CDT treated support. This level is unacceptably high and makes the combination of CDT and single sub unreliable on PEN. Treatment using condition GDT A improves the dry adhesion of all subsequent coatings, but still leaves unacceptable removal in the wet adhesion test for the cases of no sub or gel sub. It is very effective, however, at reliably producing good adhesion for the single sub formulation. Similarly, GDT B is not able to produce good wet adhesion with no sub, but results in a significant improvement in the adhesion of the single sub. Finally, we see that under conditions GDT C and GDT D we are able to promote good wet and dry adhesion in the cases of no sub, gel sub and single sub. These treatment conditions, therefore, are highly preferred. The examples demonstrate that for PEN the desired nitrogen treatments take place at low energies and the desired oxygen treatments take place at high energies.

Table 2 shows the XPS surface analysis and contact angle measurements on PEN surfaces treated under the four GDT conditions. Shown are the amount of nitrogen and oxygen present within a depth of approximately 5 nm in each case. Nitrogen treatments (GDT A and GDT C) induce rearrangement of the inherent ester groups in the PEN into ether, carbonyl and carboxyl groups, with the carboxyl groups dominating. The amount of rearrangement is shown in these cases. Finally, contact angle measurements were made using buffered solutions with a pH of 11–12 (high) and a pH of 2.5–3.5 (low). These measurements are very sensitive to the top 1 nm surface of the polymer and reveal differences not evident in the XPS data. In particular, the amount of oxygen in the top 5 nm of the CDT PEN and GDT PEN are similar based on XPS measurements. However, the contact angle measurements show that the upper 1 nm of these two treated surfaces is very different. Angle-resolved XPS measurements confirmed the contact angle results. The angle-resolved XPS measurements clearly show that GDT produces a different oxygen depth distribution than CDT. The oxygen depth distribution in the upper 5 nm is relatively flat for CDT PEN but follows an exponential drop for GDT PEN.

CDT and GDT are also significantly different in the uniformity of the treatment which can be determined from the shape of the drop used to measure the contact angles. For all the nitrogen GDTs, the drop forms a uniform circular shape. For oxygen GDT, the drop is uniform only when the contact angle is below about 12 degrees for pH 11–12 and below about 30 degrees for pH 2.5–3.5. For CDT, the shape of drop is irregular for both pH's at all treatment levels.

TABLE 2

| Treatment | % Nitrogen | % Oxygen | Rearrangement | Contact Ang. (high pH) | Contact Ang. (low pH) |
|---|---|---|---|---|---|
| GDT A | 14–15 | 17–18 | 60–70% | 20 | 35 |
| GDT B | 0 | 26–28 | — | 12 | 36 |
| GDT C | 9–10 | 20–21 | 20–25% | 35 | 45 |
| GDT D | 0 | 30–32 | — | 10 | 23 |
| CDT | <1 | 29–31 | — | 30 | 36 |
| No Treatment | 0 | 22 | — | 61 | 62 |

PET AS SUBSTRATE

In order to further illustrate the nature of the invention, oxygen and nitrogen treatments were done on PET base and subsequently coated with a standard gel sub and black and white emulsion. All of the treatments used a dc (full wave rectified ac) power supply. GDT E was done in nitrogen at an energy of 3 J/cm$^2$ and a pressure of 100 mTorr. GDT F was done in nitrogen at an energy of 0.35 J/cm$^2$ and a pressure of 35 mTorr. GDT G was done in oxygen at an energy of 0.35 J/cm$^2$ and a pressure of 100 mTorr. GDT H was done in oxygen at an energy of 3 J/cm$^2$ and a pressure of 35 mTorr.

Table 3 shows the results of both wet and dry adhesion tests on various coatings applied to these treatments, and compares these results to the cases of no treatment and conventional atmospheric CDT treatment.

TABLE 3

| Treatment Condition | Subbing | Dry Adhesion | Wet Adhesion (% removed) |
|---|---|---|---|
| No treatment | gel sub | 7+ | 100 |
| No treatment | single sub | 7+ | 100 |
| CDT | gel sub | 7+ | 100 |
| CDT | single sub | 0–1 | 0–20 |
| GDT E | gel sub | 0 | 0 |
| GDT F | gel sub | 7 | 1 |
| GDT G | gel sub | 7 | 0 |
| GDT H | gel sub | 0 | 1 |

We see from these results that for no treatment, as in the case of PEN, there is catastrophic failure for either sub. Also as in the case of PEN, CDT is not able to improve the adhesion of a standard gel sub to PET but does significantly improve the adhesion of single sub. In contrast, all of the GDT conditions improved the wet adhesion of gel sub to PET, and conditions GDT E and GDT H were also able to dramatically improve the dry adhesion as well. We can also see that the preferred treatment in nitrogen for PET is at high energies, while for PEN it was for low energies.

In order to examine the effect of treatment energy on the surface chemistry of PET, XPS analysis were done on material treated in oxygen and nitrogen at three different energies. All of the treatments were done at a pressure of 50 mTorr with a dc power supply. The effect of pressure has been seen to be of secondary importance. The results are shown in Table 4. As in PEN, nitrogen treatment results in rearrangement of the ester groups into ether, carbonyl, and carboxyl groups with the carboxyl groups dominating. However, the treated surface structure is very different from that of PEN.

TABLE 4

| Gas Energy (J/cm$^2$) | % Nitrogen | % Oxygen | Rearrangement |
|---|---|---|---|
| Nitrogen 3.4 | 13–14 | 14–15 | 70–80% |
| Nitrogen 1.7 | 10–11 | 18–19 | 60–70% |
| Nitrogen 0.6 | 7–8 | 23–24 | 20–25% |
| Oxygen 1.7 | 0 | 33–34 | |
| Oxygen 0.6 | 0 | 30–31 | |
| No Treatment | 0 | 28.6 | |

In summary, nitrogen GDT incorporates between 7 and 15 atomic percent nitrogen in the top 5 nm of a polyester film. Incorporated nitrogen is primarily in the form of imines, secondary amines and primary amines in a ratio of about 1:1:2. A small amount of amide groups are also formed as confirmed by static secondary ion mass spectrometry (SSIMS). Secondary amines cross link the treated surface thereby providing stability to the treated surface by slowing the surface reorganization process. The imines and primary amines provide bonding sites with acidic groups and other reactive groups in an overlayer. Both XPS and high resolution electron energy loss spectroscopy (HREELS) confirm that the treatment induces opening of the aromatic ring resulting in an aliphatic like structure which is the primary attachment site for the incorporated nitrogen. Both XPS and HREELS confirm that the treatment also induces rearrangement of the inherent ester groups into ether, carbonyl or carboxyl groups with the carboxyl groups dominating. The carboxyl groups provide potential bonding sites with basic groups in an overlayer. Based on XPS analysis, the degree of surface rearrangement is between 20 and 80% of the ester groups in the top 5 nm of the surface. Contact angle measurements with buffered aqueous solutions confirm the changes in both the acidic and basic character of the treated polyester surface. The contact angle with a buffered aqueous solution having a pH of 11–12 decreases from values between 61 to 77 degrees for the untreated polyester to 20 to 35 degrees for the treated polyester. The contact angle with a buffered aqueous solution having a pH of 2.5–3.5 decreases from values between 61 to 77 degrees for the untreated polyester to 35–45 degrees for the treated polyester. The contact angle measurements exhibit uniform wettability for all of the above-mentioned cases. These large changes in the contact angle measurements demonstrate the increase in wettability, hydrophilicity and both the acidic and basic character of the treated polyester surface.

Oxygen GDT treatment incorporates between 4 to 10 atomic percent oxygen above the original oxygen content in the top 5 nm of the polyester film. The incorporated oxygen is primarily in the form of hydroxyl, ether, epoxy, carbonyl and carboxyl groups. Both XPS and HREELS confirm that the treatment induces opening of the aromatic ring resulting in an aliphatic-like structure which is the primary attachment site for the incorporated oxygen. Contact angle measurements with buffered aqueous solutions confirm the changes in both the acidic and basic character of the treated polyester surface. The contact angle with a buffered aqueous solution having a pH 11–12 decreases from values between 61 to 77 degrees for the untreated polyester to between 6 and 15 degrees for the treated polyester. The contact angle with a buffered aqueous solution having a pH of 2.5–3.5 decreases from values between 61 to 77 degrees for the untreated polyester to 22 to 40 degrees for the treated polyester. The contact angle measurements exhibit uniform wettability only when the contact angle is below 12 degrees for pH 11–12 and below 30 degrees for pH 2.5–3.5. These large changes in the contact angle measurements demonstrate the increase in the wettability, hydrophilicity and both the acidic and basic character of the treated polyester surface.

While there has been shown and described what are at present considered the preferred embodiments of the invention, it will be obvious to those skilled in the art that various alterations and modifications may be made therein without departing from the scope of the invention as defined by the appended claims. All such modifications are intended to be included in the present application.

What is claimed is:

1. A photographic element comprising:

a polyester substrate having a surface approximately 5.0 nm thick, the surface including nitrogen from about 7.0 atomic percent to about 15 atomic percent wherein the nitrogen is in the form of imines, secondary amines and primary amines in a ratio of about 1:1:2;

a hydrophilic nonphotosensitive coating applied to the surface of the substrate; and a photographic emulsion applied to the hydrophilic nonphotosensitve coating.

2. The photographic element according to claim 1 wherein the hydrophilic nonphotosensitive layer comprises an aqueous polymer and gelatin coating composition wherein the polymer to gelatin ratio is in the range of 95:5 to 60:40 and the polymer comprises:

(a) from 1 to 60 weight percent of recurring units derived from a polymerized vinyl monomer having a primary amine addition salt component or amino styrene addition salt component;

(b) from 0 to 50 weight percent of recurring units derived from a polymerized hydrophilic vinyl monomer; and (c) from 20 to 98 weight percent of recurring units derived from a polymerized hydrophobic nonionic vinyl monomer.

3. The substrate according to claim 1 wherein the substrate comprises polyethylene naphthalate.

4. The substrate according to claim 1 wherein the substrate comprises polyethylene terephthalate.

\* \* \* \* \*